US 9,493,089 B2

United States Patent
Shin et al.

(10) Patent No.: US 9,493,089 B2
(45) Date of Patent: Nov. 15, 2016

(54) PREDICTION OF BATTERY POWER REQUIREMENTS FOR ELECTRIC VEHICLES

(71) Applicant: The Regents of The University of Michigan, Ann Arbor, MI (US)

(72) Inventors: Kang G. Shin, Ann Arbor, MI (US); Eugene Kim, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 35 days.

(21) Appl. No.: 14/666,369

(22) Filed: Mar. 24, 2015

(65) Prior Publication Data
US 2015/0266390 A1 Sep. 24, 2015

Related U.S. Application Data

(60) Provisional application No. 61/969,283, filed on Mar. 24, 2014.

(51) Int. Cl.
*B60L 11/18* (2006.01)
*B60L 15/20* (2006.01)
*B60L 3/12* (2006.01)
(Continued)

(52) U.S. Cl.
CPC .............. *B60L 11/1851* (2013.01); *B60L 3/12* (2013.01); *B60L 15/2045* (2013.01); *H02J 7/00* (2013.01); *B60L 2240/12* (2013.01); *B60L 2240/14* (2013.01); *B60L 2240/642* (2013.01); *B60L 2260/44* (2013.01); *B60L 2260/54* (2013.01); *H01M 10/48* (2013.01); *H01M 2220/20* (2013.01); *Y02T 10/645* (2013.01); *Y02T 10/7005* (2013.01); *Y02T 10/705* (2013.01); *Y02T 10/72* (2013.01); *Y02T 10/7283* (2013.01); *Y02T 10/7291* (2013.01); *Y02T 90/16* (2013.01)

(58) Field of Classification Search
CPC ......... G01M 17/00; B60L 11/18; B60L 8/00; B60L 11/1879; B60L 11/1887; B60L 11/1864; B60L 11/1851; B60L 15/2045; B60L 3/12; G06F 17/00; H02J 7/00; H02J 7/0075; B60W 20/00; B60W 10/26; F01N 3/20; Y02T 10/7291; Y02T 10/645; B60K 6/48; H01M 10/48; H01M 10/44
See application file for complete search history.

(56) References Cited

U.S. PATENT DOCUMENTS 6,362,602 B1 * 3/2002 Kozarekar ........... B60L 11/1851
320/160
8,783,396 B2 * 7/2014 Bowman ................... B60K 6/46
180/65.285

(Continued)

FOREIGN PATENT DOCUMENTS

| JP | 2011059921 A | 3/2011 |
| JP | 2013070515 A | 4/2013 |
| KR | 20120073843 A | 7/2012 |

*Primary Examiner* — Behrang Badii
(74) *Attorney, Agent, or Firm* — Harness, Dickey & Pierce, PLC

(57) ABSTRACT

An efficient way of predicting the power requirements of electric vehicles is proposed based on a history of vehicle power consumption, speed and acceleration as well as road information. By using this information and the operator's driving pattern, a model extracts the vehicles history of speed and acceleration, which in turn enables the prediction of the vehicle's future power requirements. That is, the power requirement prediction is achieved by combining a real-time power requirement model and the estimation of vehicle's acceleration and speed.

8 Claims, 9 Drawing Sheets

(51) Int. Cl.
  *H02J 7/00* (2006.01)
  *H01M 10/48* (2006.01)

(56) References Cited

U.S. PATENT DOCUMENTS

| | | | |
|---|---|---|---|
| 9,050,972 B2* | 6/2015 | Severinsky | B60H 1/004 |
| 2006/0102397 A1* | 5/2006 | Buck | B60L 11/1887 |
| | | | 429/432 |
| 2006/0261782 A1* | 11/2006 | Kim | H01M 10/44 |
| | | | 320/132 |
| 2011/0174561 A1* | 7/2011 | Bowman | B60K 6/46 |
| | | | 180/65.245 |
| 2011/0313647 A1 | 12/2011 | Koebler et al. | |
| 2012/0296512 A1* | 11/2012 | Lee | B60K 6/48 |
| | | | 701/29.3 |
| 2014/0025364 A1 | 1/2014 | Ballentin et al. | |

* cited by examiner

PREDICTION OF BATTERY POWER REQUIREMENTS FOR ELECTRIC VEHICLES

CROSS-REFERENCE TO RELATED APPLICATIONS

This application claims the benefit of U.S. Provisional Application No. 61/969,283 filed on Mar. 24, 2014. The entire disclosure of (the above application is incorporated herein by reference.

GOVERNMENT CLAUSE

This invention was made with government support under CNS1138200 awarded by the National Science Foundation. The Government has certain rights in the invention.

FIELD

The present disclosure relates to the prediction of battery power requirements for electric vehicles.

BACKGROUND

As electric vehicles (EVs) are getting popular, the reliability and energy capacity of batteries become a critical issue, because cost and weight of EVs largely depend on the reliability and energy capacity of a battery management system (BMS) including battery cells and management system in the EVs. This is because higher battery reliability and capacity means a longer operating time of the entire battery system and the less number of required battery cells and protection circuits in the system. To increase reliability and efficiency of BMSes we propose battery power requirement prediction, which enables BMS to extend lifetime and operating time of battery and protect battery cells.

The main motivation of this disclosure is to develop a systematic way of predicting an EV's power requirement. Prediction of an EV's power requirement helps protect individual battery cells and keep cells within their operating limits. While keeping cells from out-of-tolerance conditions, the power requirement prediction enables BMS to schedule battery cells to be discharged and recharged more efficiently while balancing the cells. This allows for the optimal charging of cells while responding to changes in the vehicle's operating mode.

However, prediction of required battery power is difficult, since it has to work in real time under rapidly varying charge-discharge conditions as the driver accelerates and decelerates the vehicles, and also in harsh and uncontrolled environments which have influence on power requirement. Besides, it must interface with other on-board systems, such as engine management, climate control, communications, and safety systems.

This disclosure proposes an efficient way of predicting the power requirements of electric vehicles (EVs) based on a history of their power consumption, speed, acceleration, as well as road information. The predicted power requirement is then used by a battery management system to prevent the damage of battery cells that might result from high discharge rates. This prediction also helps battery management systems efficiently schedule and allocate battery cells in real time to meet an EVs power demands.

This section provides background information related to the present disclosure which is not necessarily prior art.

SUMMARY

This section provides a general summary of the disclosure, and is not a comprehensive disclosure of its full scope or all of its features.

A technique is provided for predicting battery power requirements along a route traversed by a vehicle. The technique includes: defining a power requirement model for battery cells powering the vehicle, where the power requirement model outputs a power requirement for the battery cells as a function of velocity of the vehicle and acceleration of the vehicle; segmenting road along the route into a plurality of road segments; determining velocity and acceleration for the vehicle along a given road segment; predicting power requirement for the battery cells of the vehicle while the vehicle is traversing the given segment, where the power requirement is predicted using the determined velocity of the vehicle along the given road segment, the determined acceleration of the vehicle along the given road segment and the power requirement model; and configuring the battery cells in accordance with the predicted power requirement while the vehicle traverses the given road segment. Battery cells may be configured by allocating battery cells to an electric load of the electric vehicle based in part on the predicted power requirements of the electric vehicle while traversing the given segment In some embodiments, the route is segmented in accordance with slope of the road and/or the speed limit along the road.

In some embodiments, the power requirements is further defined as $$P_{total}(a,V,\theta) = c_1 \cdot a \cdot V + c_2 \cdot V^3 + c_3 \cdot \sin\theta \cdot V + c_4 \cdot V$$

where V is velocity of the vehicle, a is acceleration of the vehicle, $\theta$ is road slope, and $c_1$, $c_2$, $c_3$ and $c_4$ are coefficients.

In some embodiments, acceleration is determined for a given road segment based on relative speed between the vehicle and another vehicle traversing the route, speed limit for given road segments.

In another aspect, a technique is provided for managing power consumption of battery cells in a vehicle as it traverses a route. The technique includes: defining, by a battery manager, a power requirement model for battery cells powering the vehicle, where the power requirement model having one or more coefficients and outputs a power requirement for the battery cells as a function of velocity of the vehicle, acceleration of the vehicle and slope of road; identifying, by the battery manager, a given road segment from the plurality of road segments; estimating, by the battery manager, coefficients for the power requirement model using a linear regression method; determining, by the battery manager, slope for the given road segment; predicting, by the battery manager, acceleration of the vehicle in the given road segment; calculating, by the battery manager, velocity of the vehicle in the given road segment; predicting, by the battery manager, power requirement for the battery cells in the given road segment, where the power requirement is predicted using the estimated coefficients, the slope for the given road segment, the predicted acceleration, the calculated velocity and the power requirement model; and configuring, by the battery manager, the battery cells in accordance with the predicted power requirement while the vehicle traverses the given road segment, where the battery manager is implemented by a computer processor.

The method may further includes monitoring the vehicle as it traverses the route and, upon entering the given road segment, configuring the battery cells in accordance with the predicted power requirement and/or predicting power requirement for the battery cells in a next road segment.

In yet another aspect, a battery management system is provided for use in an electric vehicle. The system includes: a vehicle monitor configured to monitor the vehicle as it traverses a route and operates to segment the road along the route into a plurality of road segments; a power requirements model that predicts power requirements for battery cells powering the vehicle and resides in a data store, where the power requirement model defines one or more coefficients and outputs a power requirement for the battery cells as a function of velocity of the vehicle, acceleration of the vehicle and slope of road; a power predictor configured to retrieve slope for a given road segment and operates to determine velocity of the vehicle in the given road segment and the acceleration of the vehicle in the given road segment, wherein the power predictor accesses the power requirements model and further operates to predict power requirement for the battery cells in the given road segment using the slope for the given road segment, the acceleration in the given road segment, the velocity in the given road segment and the power requirement model; and a battery configurator interfaced with the power predictor and the battery cells and operates to allocate battery cells to an electric load of the vehicle based in part on the predicted power requirements of the vehicle, where vehicle monitor, the power predictor and the battery configurator are implemented by a computer processor residing in the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
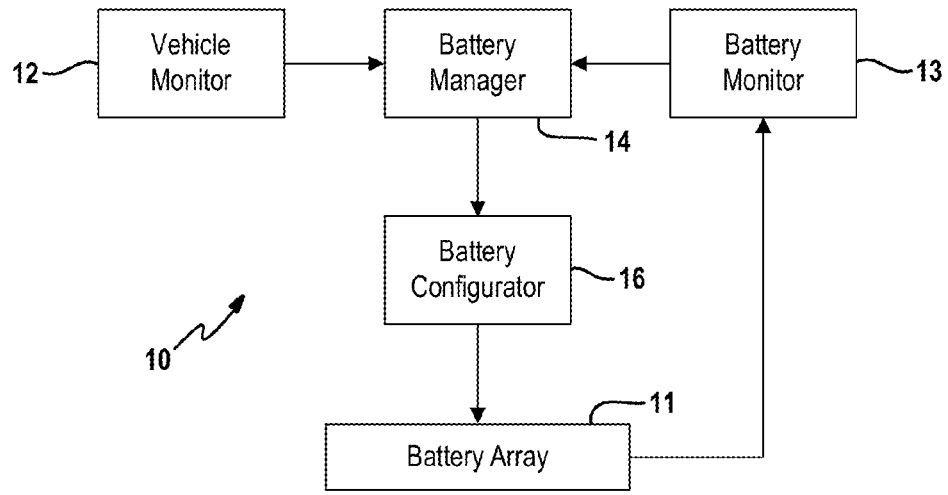
FIG. 1 is a block diagram of an example battery management system for use in a vehicle.

FIG. 1 is a diagram of an example embodiment of a battery management system (BMS) 10 which may be employed by an electric vehicle. To manage large-scale batteries or a battery array 11 in the presence of nonlinear, complex battery dynamics, the battery management system 10 may be comprised of a vehicle monitor 12, a battery status monitor 13, a battery manager 14, and a battery configurator 18. While reference is made throughout this disclosure to power requirement predictions for electric vehicles, it is envisioned that the broader aspects of this concept may be extended to other types of vehicles as well as other battery applications.

The vehicle monitor 12 is interfaced with the battery manager 14 and configured to monitor the vehicle as it traverses a route. For example, the vehicle monitor 12 determines the location of the vehicle along the route, for example through the use of GPS. The vehicle monitor 12 also determines speed, acceleration and other vehicle operating parameters. This vehicle information is provided to the battery manager 14 by the vehicle monitor 12.

The battery status monitor 13 is configured to monitor the battery cells and/or battery packs which comprise a battery array 11. The battery status monitor 12 is interfaced with the battery manager 14 and periodically reports the state (e.g., state of charge), temperature, and open circuit voltage for each battery cell and/or battery pack in the battery array 11. The battery status monitor 13 can also calculate each cell's discharge rate and rest period, and then sends the results to the battery manager 14.

Reconfigurable battery arrays 11 are known in the art. Based on vehicle information and battery information, the battery manager 14 determines the optimal battery arrangement guaranteeing the activity of the vehicle and maximizing the operating time and life time of the battery system. For example, the battery manager 14 decides which battery cells are to be connected to electric load and which connections are to be used for the battery cells. The battery configurator 16 in turn sets the connection of battery cells as instructed by the battery manager 14. Each of these components are implemented in hardware and/or software preferably residing on board the vehicle.

One of the key features of a battery management system is to schedule and allocate battery cells to meet the vehicle's power demand in an effective and safe way. To do this, the battery manager 14 includes a power requirement predictor (PRP). The power requirements predictor predicts power requirements for vehicle as will be further described below.

Figure 2:
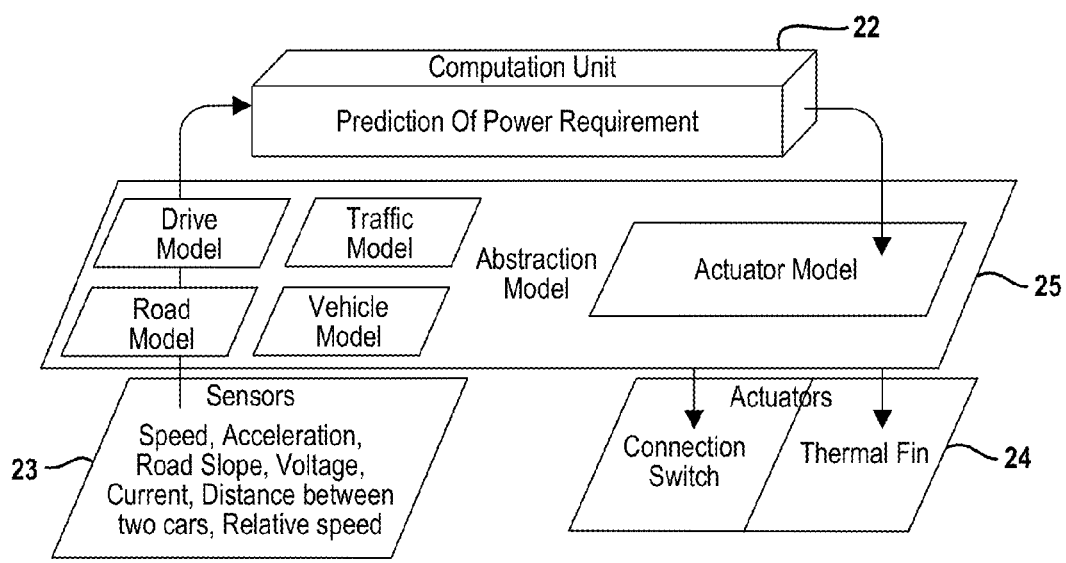
FIG. 2 is a diagram of a cyber-physical system for a power requirement predictor (PRP)

FIG. 2 is a diagram depicting an abstraction between a power requirement predictor 22 and the physical components of an electric vehicle system, such as sensors 23 and actuators 24. The power requirement predictor 22 is design to predict the power requirements for an electric vehicle as will be further described below. Prediction is difficult because many of the power requirements depend on physical elements, such as traffic conditions, traffic regulations, the operator's driving pattern and road conditions. Thus, the power requirement predictor 22 should capture couplings with these physical elements. To achieve this, the physical elements are abstracted into an abstraction layer 25 with input and output of the interface directly connected to the physical components.

Figure 3:
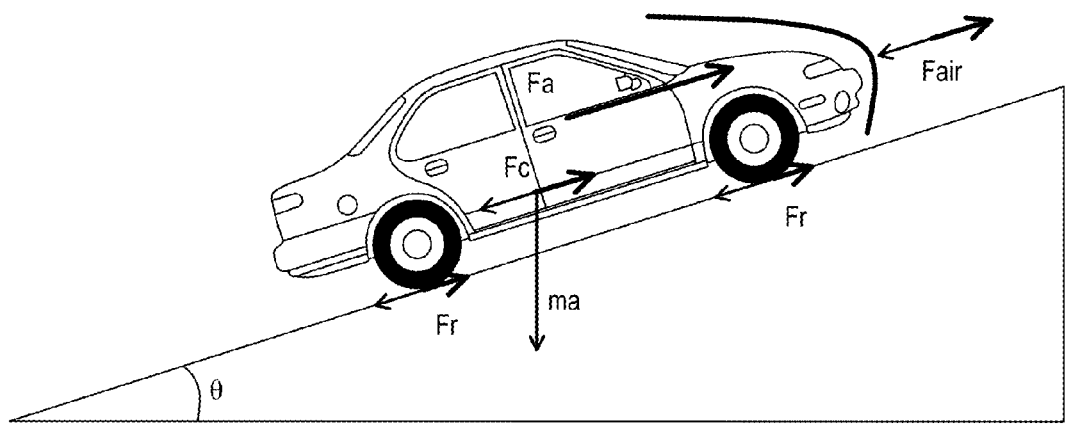
FIG. 3 is a diagram illustrating a vehicle subject to different forces.

To facilitate the prediction of power requirements, a power requirement model is introduced with parameters that dictate the required power and predict each parameter from the corresponding physical model in the abstraction layer 25. This disclosure employs a simple and widely-used power requirement model with real-time adaption (i.e., history-based energy usage model) to different vehicles and operational environments. With reference to FIG. 3, a polynomial power requirement model is used that accounts for power demand according to physical laws, where $F_a$, $F_{air}$, $F_c$ and $F_r$ denote, respectively, the force for acceleration, the aerodynamic force, a load related to steepness, and rolling resistance. The total power requirement ($P_{total}$) is then calculated as the sum of all forces multiplied by the vehicle's forward speed (V):

$$P_{total} = F_a \cdot V + F_{air} \cdot V + F_c \cdot V + F_r \cdot V \quad (1)$$

$$= m \cdot a \cdot V + \frac{1}{2} \cdot \rho_{air} \cdot C_d \cdot A \cdot V^3 + m \cdot g \cdot \sin\theta \cdot V + m \cdot g \cdot K_r \cdot V,$$

where $\theta$ denotes the slope angle, and the other parameters are further described below.

Simplicity is the primary reason for adopting this model. Since the model depends only on some physical parameters, their actual values can be obtained from measurement or calculation. Moreover, the calculation of the power requirement in Eq. (1) requires only basic operations, facilitating the real-time prediction of power requirements. Below it will be shown that the model, albeit simple, yields good accuracy in estimating the required power. Nonetheless, other types of models also fall within the broader aspects of this disclosure.

To estimate the amount of power that the battery management system should provide during an upcoming time interval, all of the parameters in Eq. (1) are predicted. Such prediction requires the knowledge of (i) the frequency of change in each parameter and (ii) the information necessary to predict each parameter. One can then tailor prediction schemes to this knowledge. Table 1 below summarizes the parameter characteristics.

car's location on the road. Thus, the parameters can be accurately predicted by using offline information of the roads (e.g., Google Map) and real-time location information (e.g., GPS). For example, information about road type and slope can be downloaded a priori from a pre-downloaded map, thus acquiring $K_r$ and $\theta$ for a given location. By incorporating the static information into real-time location information, the parameters in C2 can be easily predicted despite their dynamic variation.

In contrast, the two parameters a and V in C3 dynamically change and are difficult to predict, since they depend not only on road information, such as the road type and slope, but also on the operator's driving pattern, which are difficult to predict and analyze. In particular, drivers have their own driving patterns related to complex human decision-making processes, and the pattern might change with their mood or physical condition. Besides, the driver should obey traffic regulations and consider traffic conditions, which significantly affect the two parameters. As a result, two different approaches are needed in predicting the parameters in C1, C2, and C3 as detailed below.

Figure 5:
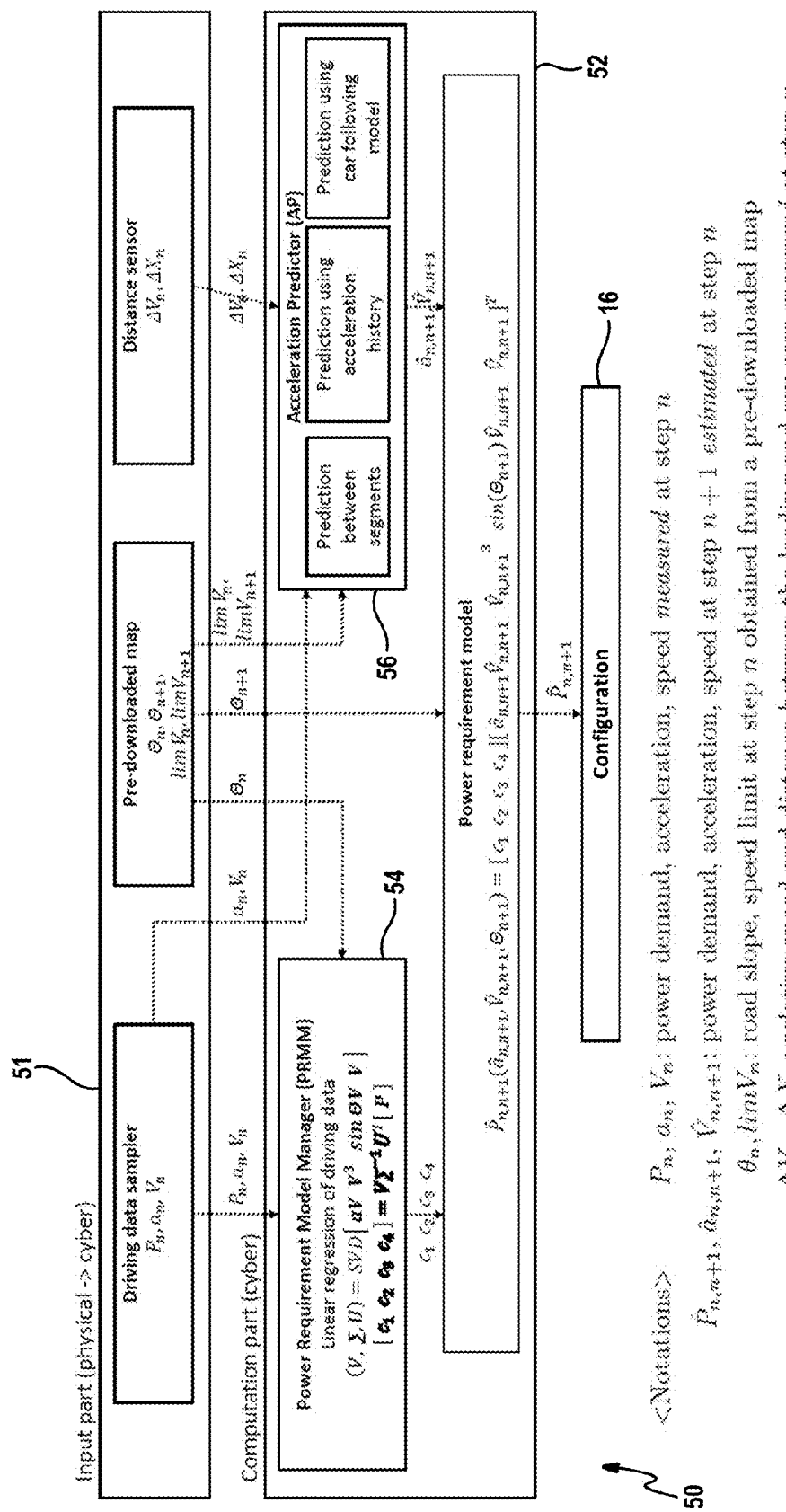
FIG. 5 is block diagram depicting an example embodiment for the power requirement predictor (PRP)

FIG. 5 depicts an example embodiment for a power requirements predictor 50. In this embodiment, the power requirements predictor 50 estimates the next step (step n+1) power requirement during the current time interval (step n). The power predictor is comprised generally of an input part 51 and a computation part 52. The input part 51 provides all measured data of the current step and all pre-calculated data for the next step. Using this data, the computation part 52 estimates all the parameters in C1-C3, and then outputs the estimated power requirement for the next step (i.e., $\hat{P}_{n,n+1}$) using the power requirement model in Eq. (1).

The input part 51 provides measured or pre-calculated data to the computation part 52. More specifically, the data is comprised of three components: (i) the driving data sampler for the power consumption ($P_n$), acceleration ($a_n$), and speed ($V_n$); (ii) the pre-downloaded map for the current and next road slopes ($\theta_n$ and $\theta_{n+1}$), and the current and next speed limits ($\lim V_n$ and $\lim V_{n+1}$); and (iii) the distance sensor for the relative speed and distance between the leader and the follower cars ($\Delta V_n$ and $\Delta X_n$). Depending on the model, other types of data may also be input by the input part.

Before detailing the computation part 52, a road segment is first defined for use in the computation part. In one

| | a (m/s²) | V (m/s) | m (kg) | g (m/s²) | $K_r$ | a (degree) | Pair (kg/m²) | $C_d$ | A (m²) |
|---|---|---|---|---|---|---|---|---|---|
| Dynamics | Extremely high | High | Extremely low | Extremely low | High | High | Low | Extremely low | Extremely low |
| Dependency | Driver, Road, Traffic | Driver, Road, Traffic | Vehicle Structure | Altitude | Tire | Road | Altitude | Vehicle Structure | Vehicle Structure |

Parameter characteristics are then used to categorize the parameters as follows:

C1. stable: mass of the vehicle (m), gravitational acceleration (g), air density ($\rho_{air}$), drag coefficients ($C_d$) and frontal area (A);

C2. dynamic but easy to predict: rolling resistance coefficient ($K_r$) and road slope ($\theta$); and C3. dynamic and difficult to predict: acceleration (a) and speed (V).

Figure 4:
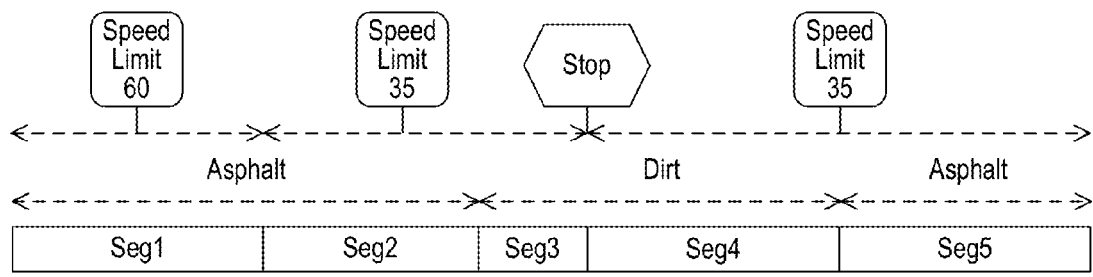
FIG. 4 is a diagram illustrating an example of road segmentation.

The parameters in C1, such as m, $C_d$ and A, rarely change as they depend only on the vehicle itself. Also, g and $\rho_{air}$ change very slowly. The parameters in C2 depend on the embodiment, a road segment is a continuous road interval in which road conditions and traffic regulations are uniform as seen in FIG. 4. The concept of road segment is important, since some parameters in the power requirement model vary with road segment. Given a route, the vehicle monitor 12 or the battery manager 14 can segment the road along the route into a plurality of road segments, for example in accordance with the slope of the road and/or the speed limit along the road. For instance, a new segment is demarcated each time speed limit along the road changes. It is envisioned that road may be segmented using other attributes as well.

With continued reference to FIG. 5, the computation part 52 estimates the parameters in two different ways. As noted above, the parameters in C1 and C2 are either slowly changing or predictable, but the parameters in C3 are difficult to estimate. Considering the different parameter characteristics, the power requirement model manager 54 (PRMM) and the acceleration predictor 56 (AP) predict the parameters in C1 and C2, and those of C3, respectively.

The parameters in C1 change slowly, and $K_r$ in C2 is consistent within a road segment. So, after segmentation of the road, we can abstract $K_r$ and the parameters in C1 into four coefficients, thus reducing the number of input parameters for the power requirement model as follows.

$$P_{total}(a,V,m,g,K_r,\theta,\rho,C_d,A) = \text{the } RHS \text{ of Eq. (1)}$$

$$\Rightarrow P_{total}(a,V,\theta) = c_1 \cdot a \cdot V + c_2 \cdot V^3 + c_3 \cdot \sin\theta \cdot V + c_4 \cdot V. \quad (2)$$

Then, Eq. (2) depends only on the coefficients $c_1$-$c_4$, acceleration (a), speed (V) and road slope (θ). Since θ is given by the pre-downloaded map, only the coefficients and acceleration and speed need to be estimated.

For coefficients, model manager 54 adopts a popular history-based estimation—linear regression, calculating the coefficients based on the past data of all parameters in Eq. (2). In an example embodiment, vehicle speed (V) and acceleration (a) are measured and stored, for example using a speed sensor and an acceleration sensor. The amount of discharged power (P) for driving can be captured by multiplying voltage and current that is extracted from voltage and current sensors in a battery monitor. Suppose the model Ax=b describes linear relationship between input data set (A) and result data set (b), and x is a coefficient vector for the linear model. The coefficient vector (x) is derived to minimize $|Ax-b|^2$ through singular value decomposition (SVD) and calculation of pseudo-inverse of A. In this case, the above equation can be rewritten as follows:

$$A = \{aV V^3 \sin(\Theta) V V\}, x = \{c_1, c_2, c_3, c_4\}, b = \{P\}$$

First, singular value decomposition is performed for input data (A={aV V³ sin(Θ)V V}) to derive left-singular vectors (U), right-singular vectors (V), rectangular diagonal matrix (Σ), and pseudo-inverse of A (=VΣ⁻¹U^T). The linear coefficient vector (x={$c_1$, $c_2$, $c_3$, $c_4$}) is then calculated by minimizing $|Ax-b|^2$ as shown in FIG. 3. In this way, the model manager 54 can receive the current data of power requirement ($P_n$), acceleration ($a_n$), speed ($V_n$), and slope ($\theta_n$), and estimate the four coefficients for prediction at the next interval. Other techniques for computing the values of the coefficients also fall with the scope of this disclosure.

On the other hand, the acceleration predictor 56 outputs acceleration and speed for the next interval. One input to the acceleration predictor 56 is the relative speed and distance between the leader and the follower cars ($\Delta V_n$ and $\Delta X_n$) which abstract the traffic flow. Of the two parameters speed and acceleration, the focus is on predicting acceleration. Once acceleration is known, velocity in the next interval can be calculated from the predicting acceleration and the velocity in the current interval. In one example, when acceleration ($a_n$) is constant, vehicle speed ($V_{n+1}$) can be estimated at next interval based on current speed ($V_n$), acceleration ($a_n$), and time interval (Δt) as follows: $V_{n+1} = V_n + a_n \cdot \Delta t$. Suppose acceleration ($a_n$) is constant for a second at 10 m/s² and current speed ($V_{n-1}$) is 30 m/s. Then, vehicle speed ($V_{n+1}$) predicted after 0.1 s (Δt) will be 31 m/s. If time interval is short, the acceleration is assumed constant during the time interval, and then this prediction can be used for estimating the next vehicle speed. In another example, the vehicle speed at the next interval can be estimated to be the speed limit for that upcoming road segment. Other techniques for estimating vehicle speed in an upcoming interval are also contemplated by this disclosure.

Figure 6:
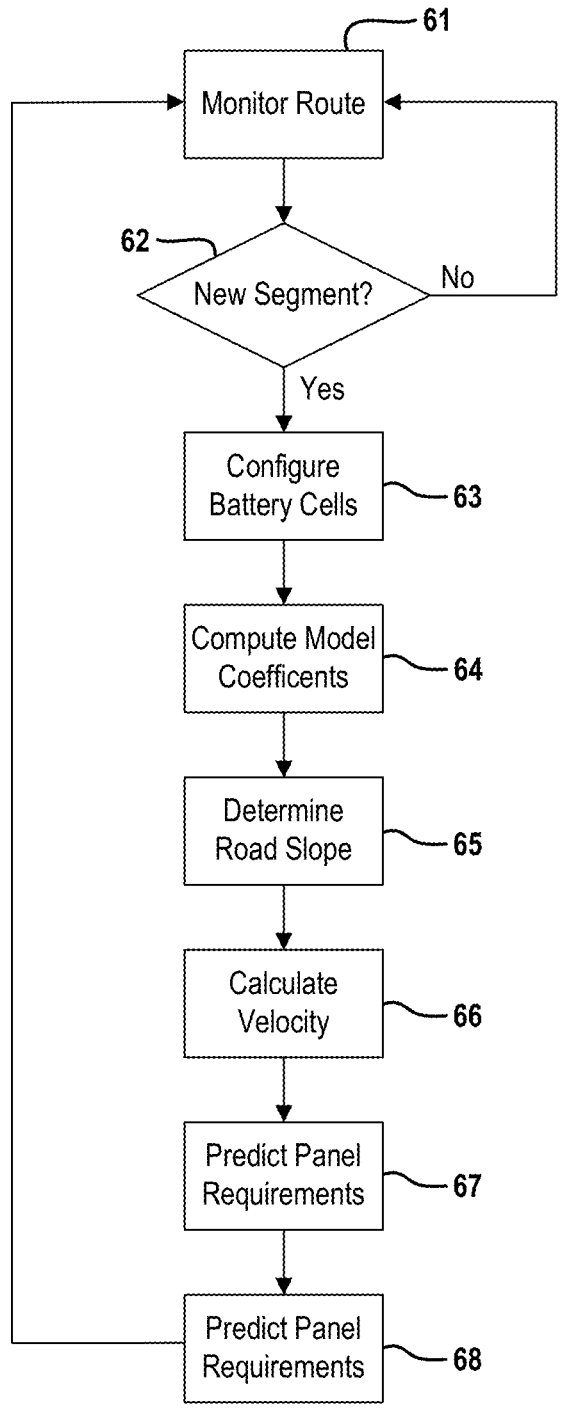
FIG. 6 is a flowchart depicting an example method for managing power consumption of battery cells in a vehicle.

FIG. 6 further illustrates an example technique for managing power consumption of the battery cells using the power requirements predictor described above. The vehicle is monitored at 61 as is traverses a route. More specifically, the vehicle location is tracked in relation to road segments as indicated at 62. Upon entering a given road segment (or just prior to), the battery configurator 16 configures the battery cells at 63 in accordance with the predicted power requirements for the given road segment.

Additionally, upon entering the given road segment, the battery manager 14 predicts the power requirements for the next road segment. Prior to the predicting power requirements, coefficients for the power requirement model may be updated at 64 with data from the most recent road segment. It is envisioned that in other embodiments the coefficients for the power requirement model are updated less frequently. The slope for the next road segment is also determined at 65, for example by retrieving slope for the road segment from a topographical map.

Next, the battery manager predicts the acceleration of the vehicle in the next road segment at 66 as well as calculates the velocity of the vehicle in the next road segment at 67. These computations are described elsewhere in this disclosure. From the acceleration, velocity and slope, the power requirements for the next road segment are then predicted at 68, for example using the power requirement model described above. As the vehicle continues to traverse the route, this process is repeated for each upcoming road segment.

As discussed earlier, it is difficult to predict a vehicle's acceleration since it depends not only on static information such as the road type and slope as well as traffic regulations, but also on dynamic information such as the operator's driving pattern and the traffic flow near the car. For accurate acceleration prediction, three key observations are made that affect the acceleration pattern. Then, acceleration prediction schemes are developed that account for some of these observations. Finally, these prediction schemes are combined to devise a unified acceleration prediction method.

Three key observations that determine the acceleration pattern are: the traffic flow around the car, the operator's driving behavior, and the traffic regulations. These observations are corroborated with experiments. The observations will be a basis for acceleration prediction schemes to be developed in the next section.

Figure 7:
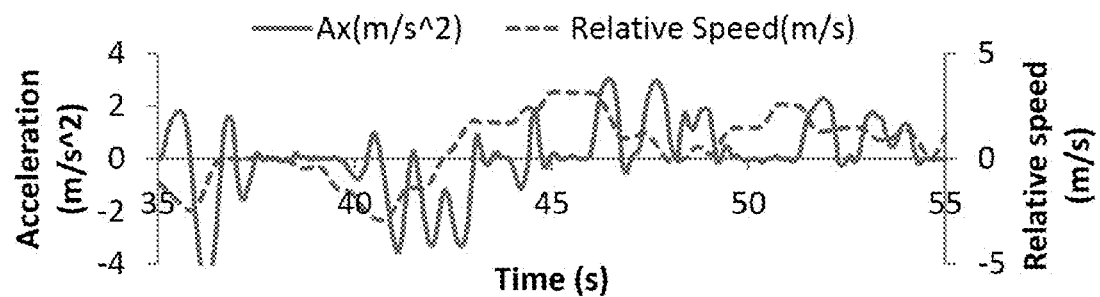
FIG. 7 is a graph showing the acceleration of a car and relative speed between the car and the leader car.

First observation is that the leader car affects the follower's acceleration pattern. As long as car A does not pass the front car B, the average speed of A cannot exceed that of B. Therefore, as shown in FIG. 7, the average relative speed between A and B is almost zero. If the relative speed is negative (positive), A tries to catch up (distance itself from) with B by acceleration (deceleration). Therefore, the front car B determines an average behavior of the follower car A's acceleration.

Figure 8:
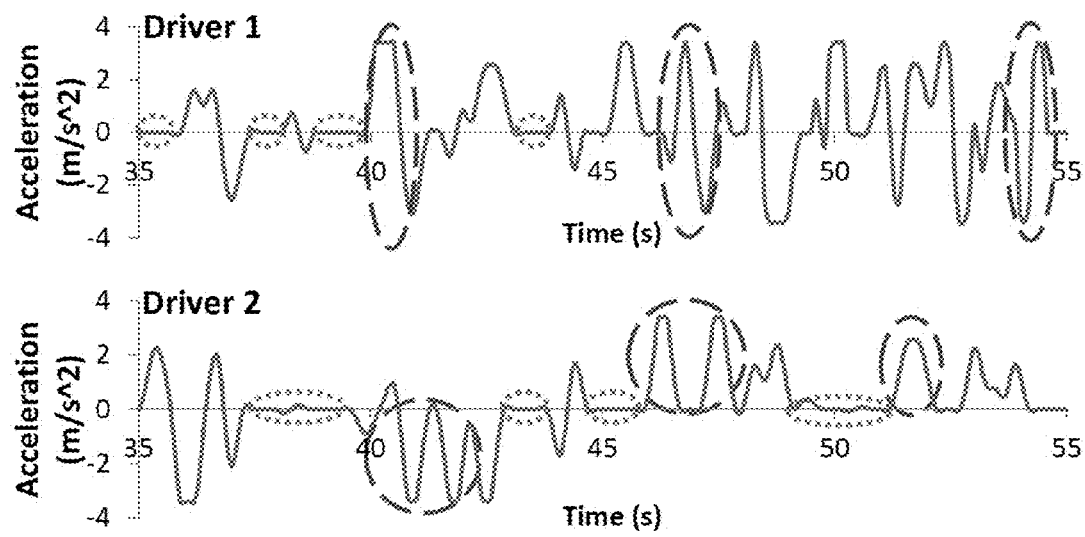
FIG. 8 are two graphs showing the reaction strength and time between two cars.
Figure 9A:
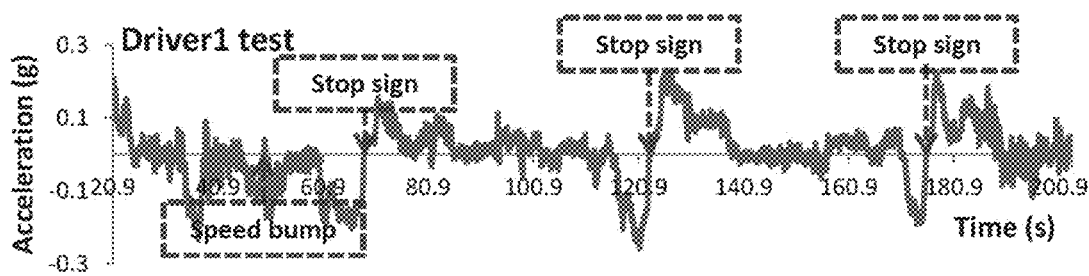
FIGS. 9A-9D are graphs showing the acceleration pattern for different drivers, respectively, along a path which includes three stop signs and a speed bump.
Figure 9B:
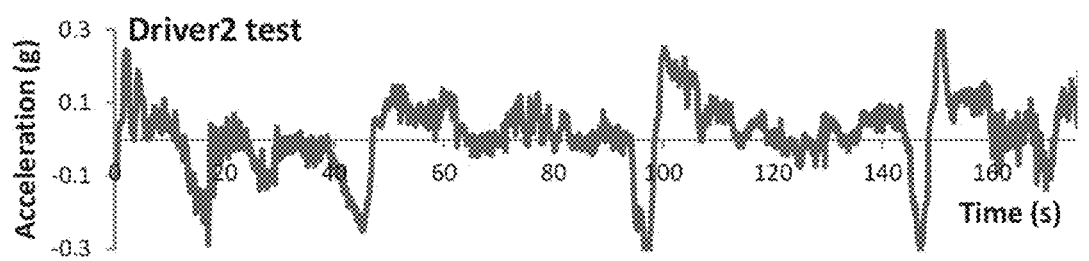
Figure 9C:
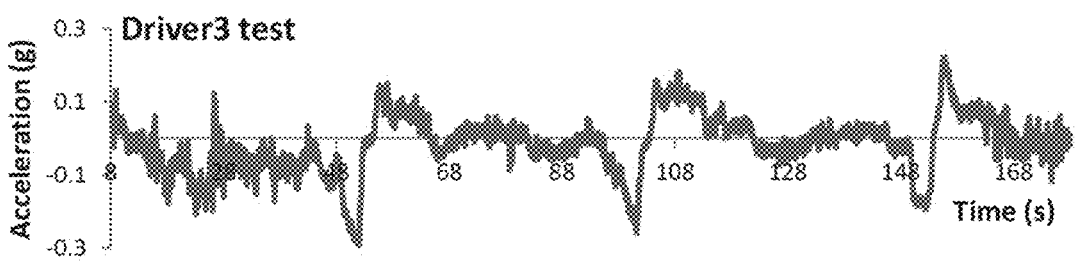
Figure 9D:
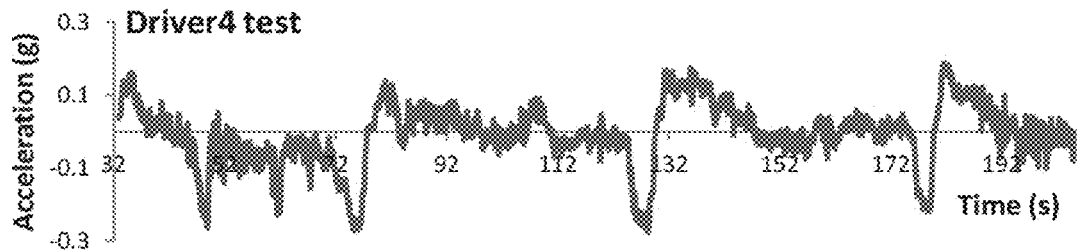

Second observation is that the operator's driving behavior affects the acceleration pattern. Each operator's driving pattern is captured with two variables: reaction strength—how quickly the operator/driver accelerates to achieve a desired speed, and reaction time—how long it takes for the driver to react to a given situation. These two variable are represented in FIG. 8 by the slope of acceleration and the duration during which the acceleration is zero. For instance, some drivers press the acceleration pedal aggressively until the vehicle reaches the desired speed, but others gradually increase/decrease speed with a long acceleration time. Although the reaction strength varies with drivers, it was found that the reaction strength of a driver remains similar all the time. The reaction time also depends on the driver. While drivers with a long reaction time tend to maintain their vehicles' speed instead of acceleration or deceleration, others with a short reaction time immediately respond to a given situation, e.g., the front car's slowdown.

Third observation is that the traffic regulations affect the acceleration pattern. The traffic regulations include speed limit, traffic lights and other traffic signs, and have a great impact on acceleration. For example, every driver is supposed to decelerate at a stop sign or speed bump, and hence, this is independent of drivers as shown in FIGS. 9A-9D. Using offline profiling of road information, the impact of traffic regulations on the acceleration pattern can be predicted.

To predict an operator's acceleration pattern, five methods are presented, each with its own properties. The first three methods utilize the history of previous acceleration patterns, thus indirectly/directly addressing O2. On the other hand, the next two methods address O1 and O3, respectively, by using an existing traffic flow model and road segmentation based on traffic regulations. The five methods are summarized in Table 2 below.

based on the errors between recorded (input) and predicted accelerations. Finally, predict the next acceleration by inner-product of the input and the correlation vectors. This method is useful when the next acceleration is highly correlated with earlier accelerations. It achieves higher accuracy than the two history-based methods at the expense of high computational complexity. Note that all history-based methods including this depend on the data sampling rate, because the higher rate can mask rapid changes of acceleration.

Many transportation researchers studied microscopic driver behavior to describe a real traffic flow. The car following model, a well-known microscopic traffic flow model, describes the vehicle's acceleration in terms of the relative speed and distance between a car and the leading car in front. Among existing car following models, this disclosure chose to use the model described by M. Bando, et al's in "Dynamics model of traffic congestion and numerical simulation" Physics Review E, vol. 51 pp 1035-1042 (1995) which extends the classic model based on the observation for optimal velocity. The main advantage of prediction with the car following model is its independence of the sampling frequency. Although this model provides which action is needed to maintain a relative speed of zero and a constant desired distance between the two cars, it does not directly provide the vehicle's acceleration, resulting in inaccurate prediction.

| Prediction methods | Previous acceleration | Previous acceleration with reaction strength | Correlation with past acceleration | Car following model | Road segmentation |
|---|---|---|---|---|---|
| Addressed observations | O2 (implicitly) | O2 (implicitly) and reaction strength in O2 | O2 (implicitly) | O1 | O3 |
| Limit to application | No limitation | No limitation | No limitation | No limitation | Segment transfer |
| Sampling rate | Dependent | Dependent | Dependent | Independent | Independent |
| Calculation cost | Low | Low | High | Low | Low |
| Input data | $a_n$ | $a_n$, reaction strength | $a_{n-q}, \ldots, a_n$ | $\Delta V_n, \Delta X_n$ | $V_n, \lim V_n + 1$ |

Considering the fact that the five methods are effective for different environments/situations, the methods are combined to devise a unified acceleration prediction method, exploiting advantages of the five individual methods.

In one method, the current acceleration is used as the next acceleration prediction. Its advantage is simplicity. This method, although naive, results in accurate prediction in case of slow acceleration fluctuation, or high sampling frequency with an almost zero battery reconfiguration time. However, this method alone cannot cope with abrupt changes in acceleration in many practical solutions.

To improve the simple acceleration method that uses the previous acceleration, the reaction strength is incorporated in O2. To do this, calculate the acceleration slope when the driver starts acceleration, and use it for the next acceleration prediction as follows:

$$\hat{a}_n = a_{n-1} + k \cdot (a_{n-1} - a_{n-2}), \quad (3)$$

where k is the sensitivity coefficient for the acceleration slope (reaction strength). This additional consideration yields more accurate prediction than the previous acceleration method while requiring only two more basic operations.

While the two history-based methods focus on the previous acceleration, the third method employs a linear filter that correlates a long history of earlier accelerations with the next acceleration. For this, first measure and record time-stamped accelerations, and then generate correlation factors To address the effect of traffic regulations, the road is segmented based on traffic regulations, and then the acceleration pattern is predicted when a car transits from a segment to another. This method enhances the accuracy of acceleration prediction between road segments; for example, if the next segment's speed limit is higher or lower than the current one, we can predict the acceleration during the segment transition by calculating of the difference in speed (limits) between the current and next segments. Since the traffic regulation information can be extracted from a pre-downloaded map, it does not depend on the data sampling frequency.

As shown in Table 2, each of the above methods has its own characteristics and advantages: (i) the history-based (the first three) methods depend on the sampling rate and are effective when the rate is high; (ii) the method based on the car following model is independent of the sampling rate and thus more widely applicable; and (iii) the road segmentation method is specialized for segment transition.

Considering these characteristics, a unified method is also proposed that predicts the acceleration in the next interval as follows: (a) when the car crosses a segment boundary, it uses the road segmentation method to predict acceleration; (b) otherwise, it predicts acceleration using a combination of methods based on acceleration history and car-following model. There are two variables that affect the decision of (b):

the sampling rate and the reaction time. As to the sampling rate, the history-based methods (the method with the car following model) are more effective than the counterpart under a higher (lower) sampling rate, because the car following model guarantees the same level of accuracy even under a low sampling rate, while the prediction of the history-based methods is accurate for a long reaction time, because drivers with a long reaction time tend to maintain their speed. On the other hand, the acceleration by drivers with a short reaction time can be described well by the car following model as the drivers react immediately to a given traffic situation.

Figure 10:
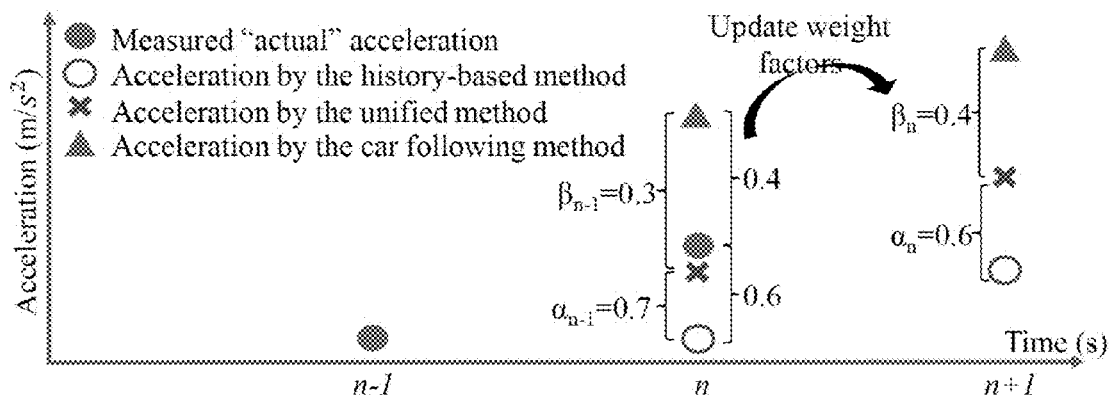
FIG. 10 is a diagram of the update of the weight factors and calculation of the next acceleration using the weight factors.

Considering the two variables, the unified method handles the situation (b) via the weights $\alpha$ and $\beta$ (such that $\alpha+\beta=1$), which are respectively the weight of one of the history-based methods and that of the method with the car following model. The weights can be calculated adaptively so as to reduce the error in predicting the next acceleration. FIG. 10 shows an example of the process of updating the weights. Suppose that the weights at step n−1 are set to $\alpha_{n-1}=0.7$ and $\beta_{n-1}=0.3$, and the method uses them to predict the acceleration of step n. Then, at step n, the actual acceleration is different from the predicted; if the weights were $\alpha_{n-1}=0.6$ and $\beta_{n-1}=0.4$, the prediction would have no error. Using this information, the method updates the weights at step n for the acceleration prediction of step n+1 as shown in the figure. While the unified method calculates average prediction error of x previous steps for the update of weights, x=1 is illustrated for simplicity of presentation. Other techniques for predicting acceleration also fall within the broader aspects of this disclosure.

Figure 11:
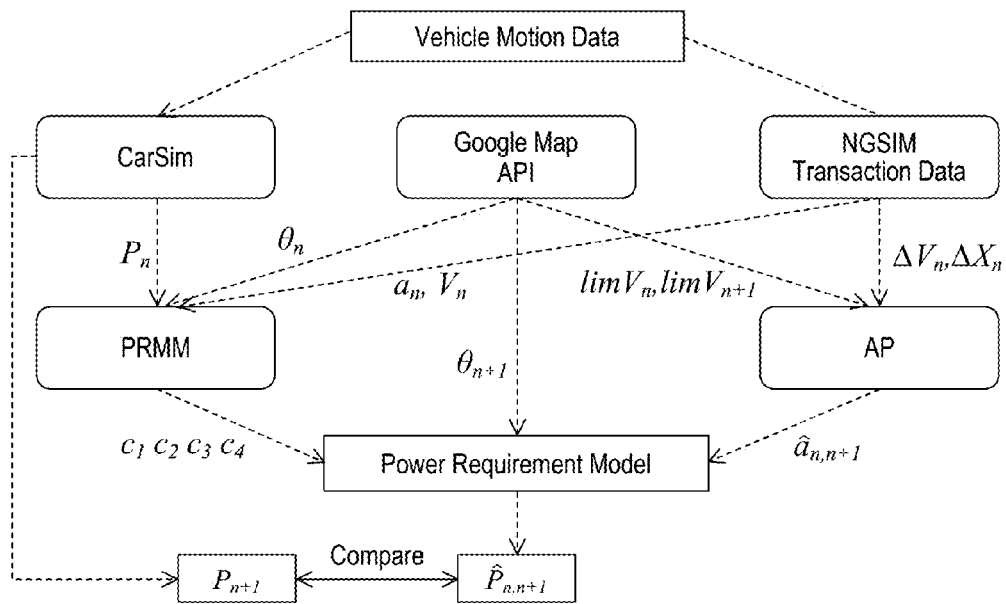
FIG. 11 is a block diagram of an evaluation system for the power requirement predictor.

To evaluate power requirements predictor, three types of offline/driving data are needed as inputs: (i) road information ($\theta$, limV), (ii) real driving data (a, V, $\Delta X$, $\Delta V$), and (iii) the measured power consumption (P). An emulator of PRP was designed, which provides actual or realistic data from three popular tools as shown in FIG. 11: Google Maps API, NGSIM, and CarSim.

Google Maps API enables developers to build map-based applications which allow us to access the road information database including the road type, the speed limit, and the elevation along with the GPS data, thus providing road information.

NGSIM (next generation simulation program) was initiated by the US DOT, and accompanied by a core of open behavioral algorithms in support of traffic simulation with a primary focus on microscopic modeling. NGSIM collects high-quality primary traffic and trajectory data to test new algorithms, thus providing real driving data). The vehicle trajectory data is used including vehicle identification number, instantaneous velocity and acceleration of the vehicle, and distance between the front-center of a vehicle and that of the preceding vehicle.

CarSim is a vehicle model simulator that allows users to design, develop, test, and plan vehicle programs in a variety of environments. It can simulate the dynamic behavior of passenger cars, racecars, light trucks, and utility vehicles, under specified road type and slope. CarSim provides animations, and outputs the required power, which can be plotted, analyzed, and exported to other software such as MATLAB, Excel, and other optimization tools. In our emulator, CarSim receives the vehicle motion data from NGSIM, and then generates the required power, as shown in FIG. 11.

For NGSIM and CarSim, a hatchback-type car was used with 205/55 R16 tires, assuming a paved road. It was also assumed that there is no regenerative break system, and therefore, the required power is always non-negative. For good road information, the southbound US-101 in Los Angeles, Calif. from Google Maps API, and NGSIM tested the car on the road with traffic of Jun. 15, 2005.

Next, the accuracy of acceleration predictor and power requirements predictor are evaluated. First, hardware factors that may degrade accuracy are discussed, such as the sampling rate of the required data, the times for computing the required power and reconfiguring the connection of battery cells. All of these factors are related to manufacturing costs; if a BMS is equipped with high-performance sensors, processors, and quickly-reconfigurable systems, the undesirable effect of these factors on prediction accuracy will be reduced. However, BMS designers are required to use cheap and low-powered devices to reduce the cost and power consumption of a BMS, which will in turn lower accuracy of PRP. While the degree of inaccuracy caused by these factors varies with hardware, it is inevitable for a BMS to spend time for sensing physical data, calculating the required power, and incorporating them into the BMS. To address this latency, we abstract these factors as a sampling rate, and evaluate it with three different rates: 2 Hz, 5 Hz, and 10 Hz.

Figure 12:
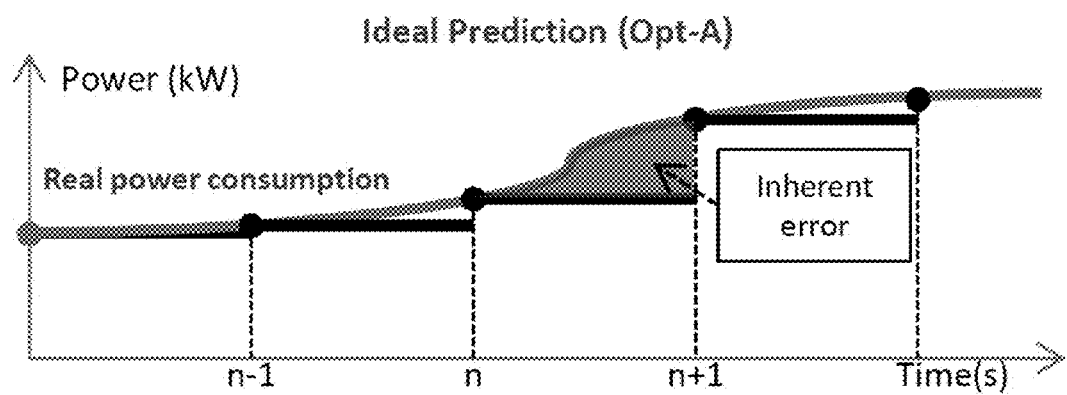
FIG. 12 is a graph showing an inherent error due to finite sampling frequency.

Such a finite sampling rate causes prediction error as shown in FIG. 12. That is, even if PRP exactly predicted the required power for step n at step n−1, the required power between steps n and n+1 varies, resulting in some error. This also holds for acceleration prediction. So, let Opt-P (Opt-A) denote this perfect prediction of power (acceleration) with the inherent error due to the finite sampling rate.

The accuracy of AP and PRP are shown with the following acceleration prediction methods, compared to Opt-A.
Prev (previous acceleration)
Prev+ (previous acceleration with reaction strength)
Corr (correlation with past accelerations)
CF (car following model)
RS (road segmentation)
Uni(H) (the unified prediction of acceleration with one of the history-based methods, i.e., H is either Prev, Prev+, or Corr)

First compare the acceleration prediction methods when the car is within a single road segment. To evaluate the accuracy of acceleration prediction, we used the driving record produced by NGSIM, and adapted each prediction method to predict the vehicle's next acceleration. To compare the performance of each prediction method, the average of absolute prediction errors are calculated, as shown in Table 3 below

|  | Average error (m/s²) | | |
| --- | --- | --- | --- |
| Prediction methods | 2 Hz | 5 Hz | 10 Hz |
| Opt-A | 0.795 | 0.369 | 0.168 |
| Prev | 1.518 | 0.989 | 0.556 |
| Prev+ | 1.566 | 1.128 | 0.461 |
| Corr | 1.465 | 1.016 | 0.444 |
| CF | 0.984 | 1.070 | 0.985 |
| Uni(Prev+) | 1.154 | 0.992 | 0.433 |
| Uni(Corr) | 1.162 | 0.948 | 0.448 |

Overall, the higher sampling rate, the more accurate prediction because more information is available to predict the next acceleration. At a low sampling rate, prediction by CF shows less prediction error since CF is the only method that is independent of the sampling rate. On the other hand, history-based acceleration predictions, such as Prev, Prev+, and Corr, performed well at a high sampling rate. Uni(•), in general yields more accurate acceleration prediction than other methods irrespective of the sampling rate. One exception is the prediction by CF at 2 Hz, because there are a limited number of driving information samples at 2 Hz and then errors of Uni(•) are likely to occur during the learning of the driver's reaction.

Figure 13:
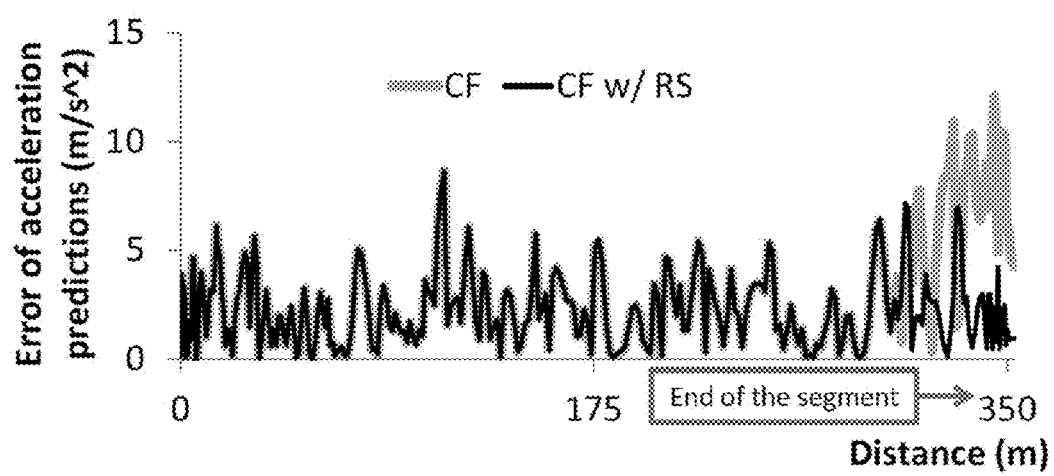
FIG. 13 is a graph illustrating the error in acceleration prediction between segments.

Next, how RS is useful is shown when a car crosses segment boundaries. To predict the acceleration between road segments, we picked two drivers from NGSIM trajectory data. The leading car passes a traffic light just before the light turns to red, but the following car stops at the traffic light since it just turned to red. Then, compare the accuracy of acceleration prediction with/without RS when CF is used as the baseline prediction method. Since the following car cannot accelerate due to the traffic light, CF's prediction of the following car's acceleration shows a large average error as shown in FIG. 13. However, the road segmentation can provide a chance to predict acceleration accurately between different road segments as shown in the figure. The average errors of acceleration prediction are 1.912 and 1.262, respectively, for CF and CF with RS.

To evaluate the accuracy of PRP, first evaluate the power requirement model in Eq. (1). Since Opt-P and Opt-A are the more accurate power and acceleration predictions achievable for a given sampling frequency, we compare Opt-P, and PRP with Opt-A. As shown in Table 4 below, the difference in average error between the two is marginal, meaning that the power requirement model we employed yields accurate enough prediction of the required power.

| Prediction methods | Average error (m/s$^2$) | | |
| --- | --- | --- | --- |
| | 2 Hz | 5 Hz | 10 Hz |
| Opt-P | 8.671 | 3.861 | 1.705 |
| PRP with Opt-A | 9.186 | 4.448 | 2.458 |
| Actual previous power | 15.884 | 10.461 | 5.904 |
| PRP with Prev+ | 17.198 | 11.212 | 5.202 |
| PRP with Corr | 12.567 | 10.368 | 4.962 |
| PRP with CF | 10.464 | 11.006 | 10.630 |
| PRP with Uni (Prev+) | 12.138 | 10.425 | 4.916 |
| PRP with Uni (Corr) | 10.891 | 10.220 | 5.068 |

Figure 14:
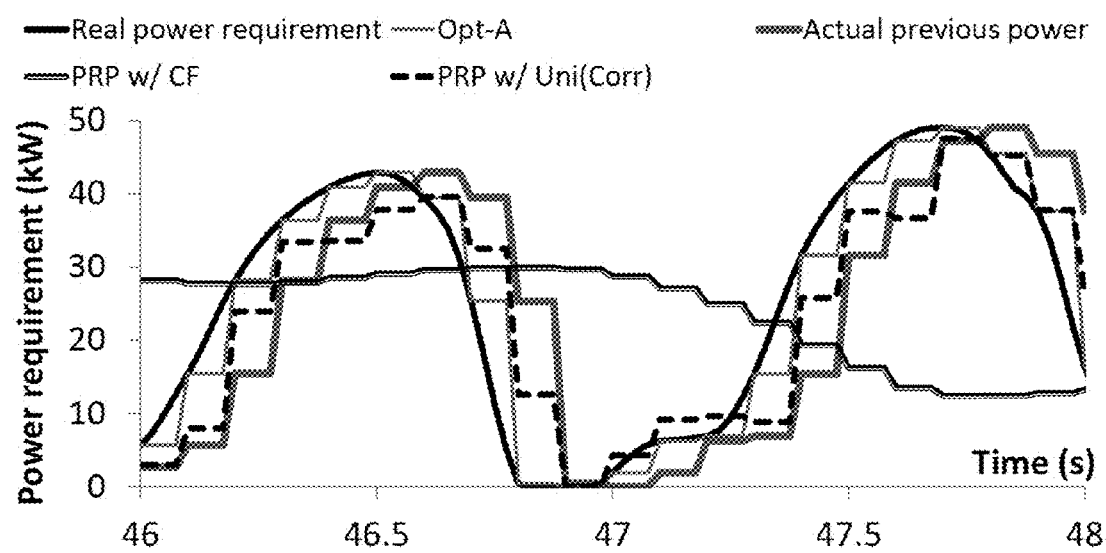
FIG. 14 is a graph showing prediction of power requirement with a 10 Hz sampling.

Since Opt-P and Opt-A are ideal power and acceleration predictions (thus infeasible), we need to employ one of acceleration prediction methods with PRP; Table 4 summarizes the prediction errors, and FIG. 14 plots the prediction. One heuristic (actual previous power) is included that uses the current actual power consumption as the next power requirement. Note that this scheme does not use the PRP. Compared to the heuristic, PRP with Uni(Corr) shows an improvement of the prediction accuracy by 69.2% at 2 Hz, 3.7% at 5 Hz, and 19.9% at 10 Hz within a road segment. If we compare PRP with different acceleration prediction methods, the trend will be similar to the accuracy of AP, because the error in predicting the power requirements is dominated by that of acceleration prediction. For example, Uni(Corr) is in general (one of) the best methods for predicting acceleration that corresponds to the required power associated with PRP. In particular, compared to PRP with CF, PRP with Uni(C0rr) predicts closer to the actual required power by 11.0% at 5 Hz, and 62.3% at 10 Hz.

Increasing demand to make EVs lighter and less expensive places stringent restrictions on battery size and capacity. It is thus important to devise advanced BMS extending battery capacity without increasing its size. A number of BMSes have been proposed to exploit nonlinear battery characteristics, including recovery and rate-capacity effects.

To introduce adaptability and efficiency into existing BMSes, this disclosure proposed a battery power requirement predictor (PRP). It predicts the amount of required battery power that enables BMSes to allocate battery cells to power EVs efficiently and safely. While recording and linearly regressing vehicle activities such as speed, acceleration, road slope and power consumption, PRP updates the (near) static parameters of the battery power requirement model for EVs. In the meantime, PRP estimates the acceleration, perhaps the most important dynamic parameter of the model, in real time, by accounting for the driver's acceleration pattern, traffic flows and regulations. An evaluation with actual experimentation and realistic simulation has shown that PRP makes a significant improvement in acceleration prediction over a simple heuristic method often seen in the existing BMSes.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality. It is understood that grouping of operations within in a given module is not limiting and operations may be shared amongst multiple modules or combined into a single module.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic control unit, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a controller selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various electronic control units may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for managing power consumption of battery cells in a vehicle as it traverses a route, the route being divided into a plurality of road segments, comprising:
    defining, by a battery manager, a power requirement model for battery cells powering the vehicle, where the power requirement model having one or more coefficients and outputs a power requirement for the battery cells as a function of velocity of the vehicle, acceleration of the vehicle and slope of road;
    identifying, by the battery manager, a given road segment from the plurality of road segments;
    estimating, by the battery manager, coefficients for the power requirement model using a linear regression method;
    determining, by the battery manager, slope for the given road segment;
    predicting, by the battery manager, acceleration of the vehicle in the given road segment;
    calculating, by the battery manager, velocity of the vehicle in the given road segment;
    predicting, by the battery manager, power requirement for the battery cells in the given road segment, where the power requirement is predicted using the estimated coefficients, the slope for the given road segment, the predicted acceleration, the calculated velocity and the power requirement model; and
    configuring, by the battery manager, the battery cells in accordance with the predicted power requirement while the vehicle traverses the given road segment, where the battery manager is implemented by a computer processor.

2. The method of claim 1 further comprises monitoring the vehicle as it traverses the route and, upon entering the given road segment, configuring the battery cells in accordance with the predicted power requirement.

3. The method of claim 1 further comprises monitoring the vehicle as it traverses the route and, upon entering the given road segment, predicting power requirement for the battery cells in a next road segment.

4. The method of claim 1 wherein identifying a given road segment further comprises segmenting road along the route in accordance with slope of the road and speed limit along the road.

5. The method of claim 1 wherein the power requirement model is further defined as $$P_{total}(a, V, \theta) = c_1 \cdot a \cdot V + c_2 \cdot V^3 + c_3 \cdot \sin\theta \cdot V + c_4 \cdot V$$

where V is velocity of the vehicle, a is acceleration of the vehicle, $\theta$ is road slope, and $c_1$, $c_2$, $c_3$ and $c_4$ are coefficients.

6. The method of claim 1 further comprises determining slope for the given road segment from a topographical map.

7. The method of claim 1 further comprises predicting acceleration of the vehicle in a given road segment based on relative speed between the vehicle and another vehicle traversing the route, speed limit for given road segments.

8. The method of claim 1 wherein configuring the battery cells further comprises allocating battery cells to an electric load of the vehicle based in part on the predicted power requirement for the battery cells.

* * * * *